United States Patent
Kuhn et al.

[11] Patent Number: 6,142,548
[45] Date of Patent: Nov. 7, 2000

[54] TRUCK BED EXTENSION APPARATUS

[75] Inventors: James J. Kuhn, St Davids; Steven Pancheri, Downingtown, both of Pa.

[73] Assignee: MK - LM, Inc., St. Davids, Pa.

[21] Appl. No.: 09/258,786

[22] Filed: Mar. 1, 1999

[51] Int. Cl.[7] .............................. B62D 33/08; B62C 1/06
[52] U.S. Cl. ...................... 296/26.1; 296/37.6; 296/57.1
[58] Field of Search ................. 296/26.11, 26.1, 296/26.08, 26.09, 26.01, 37.5, 37.6, 57.1

[56] References Cited

U.S. PATENT DOCUMENTS

| | | |
|---|---|---|
| 1,952,883 | 3/1934 | Nelson . |
| 2,556,101 | 6/1951 | Negin et al. . |
| 2,852,303 | 9/1958 | Hopson . |
| 3,004,790 | 10/1961 | Mayer . |
| 4,472,639 | 9/1984 | Bianchi . |
| 4,743,058 | 5/1988 | Fedrigo .................................. 296/157.1 |
| 4,884,838 | 12/1989 | Slater . |
| 4,951,991 | 8/1990 | Haigler . |
| 5,133,584 | 7/1992 | McCleary . |
| 5,154,470 | 10/1992 | Bringman, Jr. . |
| 5,156,432 | 10/1992 | McCleary . |
| 5,456,511 | 10/1995 | Webber . |
| 5,468,038 | 11/1995 | Sauri ...................................... 296/57.1 |
| 5,476,301 | 12/1995 | Berkich . |
| 5,501,500 | 3/1996 | Cannon . |
| 5,700,047 | 12/1997 | Leitner et al. . |
| 5,765,892 | 6/1998 | Covington ............................. 296/26.03 |
| 5,775,759 | 7/1998 | Cummins ............................. 296/26.11 |
| 5,788,311 | 8/1998 | Tibbals ....................................... 296/62 |
| 5,806,907 | 9/1998 | Martinus et al. ..................... 296/26.11 |

Primary Examiner—D. Glenn Dayoan
Assistant Examiner—Patricia Engle

[57] ABSTRACT

The present invention comprises an extension apparatus for a vehicle storage area with the preferred embodiments using a bracket and frame construction to provide for a foldable lightweight extension device.

7 Claims, 4 Drawing Sheets

TRUCK BED EXTENSION APPARATUS

The present invention relates to vehicle modifications. More particularly, the present invention relates to extensions for the storage areas of vehicles.

BACKGROUND OF THE INVENTION

Vehicle storage areas, such as pickup truck beds and sport utility or station wagon cargo areas, provide convenient transportation for all sizes and types of materials. Yet even these may lack desired versatility. For example, a pickup bed with a closed tailgate permits the retention of materials in the bed. Occasionally there is a need to carry materials larger than the closed tailgate configuration permits. The tailgate can be opened enlarging the bed size. This, however, eliminates the ability to retain the materials through use of the tailgate, and so netting or ropes may be used.

In many instances this is a less than desirable solution. Various devices exist that assist in extending vehicle storage areas, such as the one shown in U.S. Pat. No. 4,472,639, which discloses the use of panels attached to the tailgate to make an extension unit. The somewhat complicated device has panels that are heavy and unwieldy and their means of attachment to the tailgate is less than desirable. The piano hinge used in the disclosed invention for example, does not allow for movement of the unit laterally on the tailgate. This means the unit is relatively immobile.

Accordingly, it is an object of the present invention to provide an extension apparatus for vehicular storage areas.

It is a further object of the present invention to provide an inexpensive and simple extension apparatus for vehicular storage areas.

SUMMARY OF THE INVENTION

The present invention provides an apparatus for extending storage areas of vehicles. The preferred embodiment of the present invention installs on a pickup truck tailgate and is folded and unfolded as desired. An unfolded configuration of this embodiment allows for the extension of the box-like bed configuration of the pickup bed, using the tailgate as essentially part of the floor.

DETAILED DESCRIPTION OF THE PREFERRED EMBODIMENTS

Figure 1:
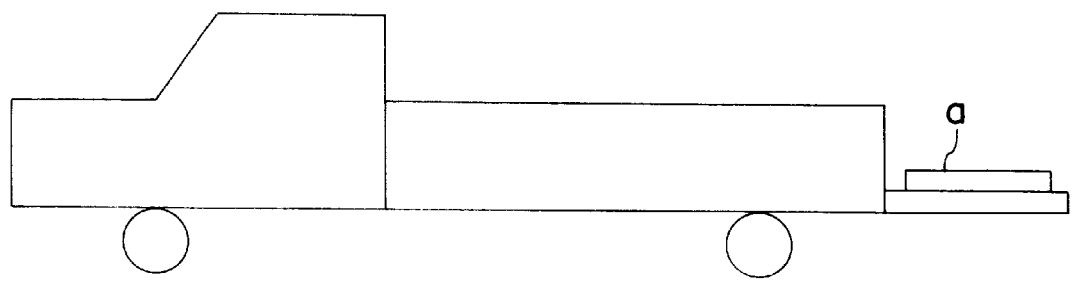
FIG. 1 shows a preferred embodiment of the present invention.

FIG. 1 shows a preferred embodiment, seen generally at a, of the present invention. The embodiment is shown folded and mounted on a pickup truck tailgate.

Figure 2:
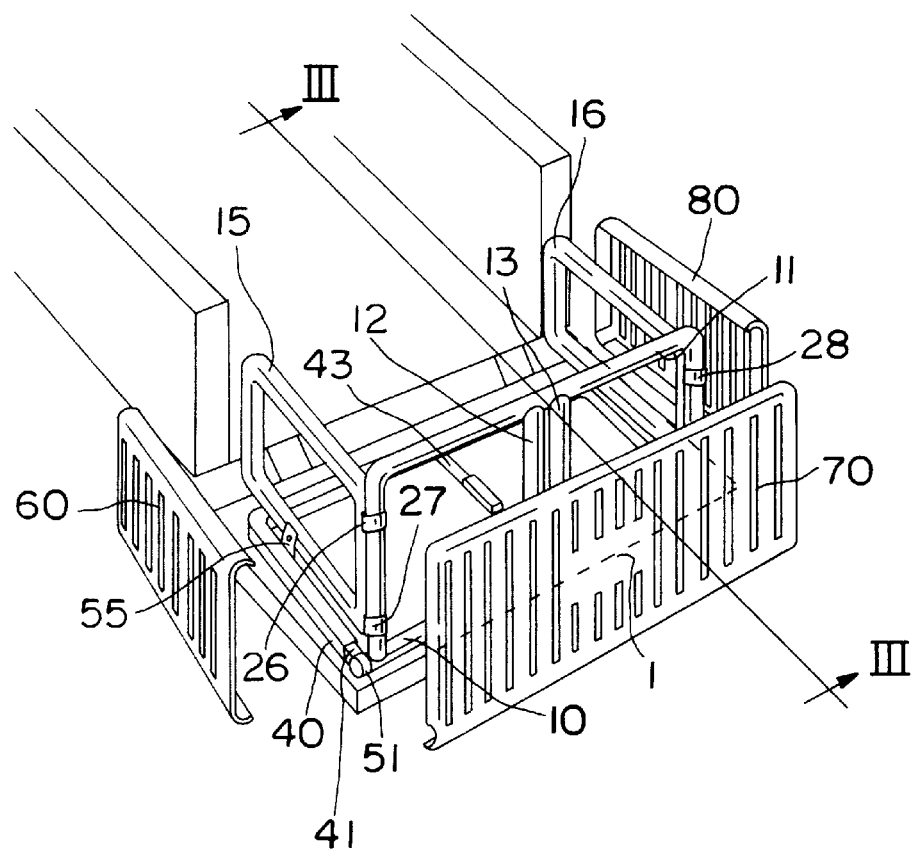
FIG. 2 shows another view of the embodiment of FIG. 1.
Figure 5:
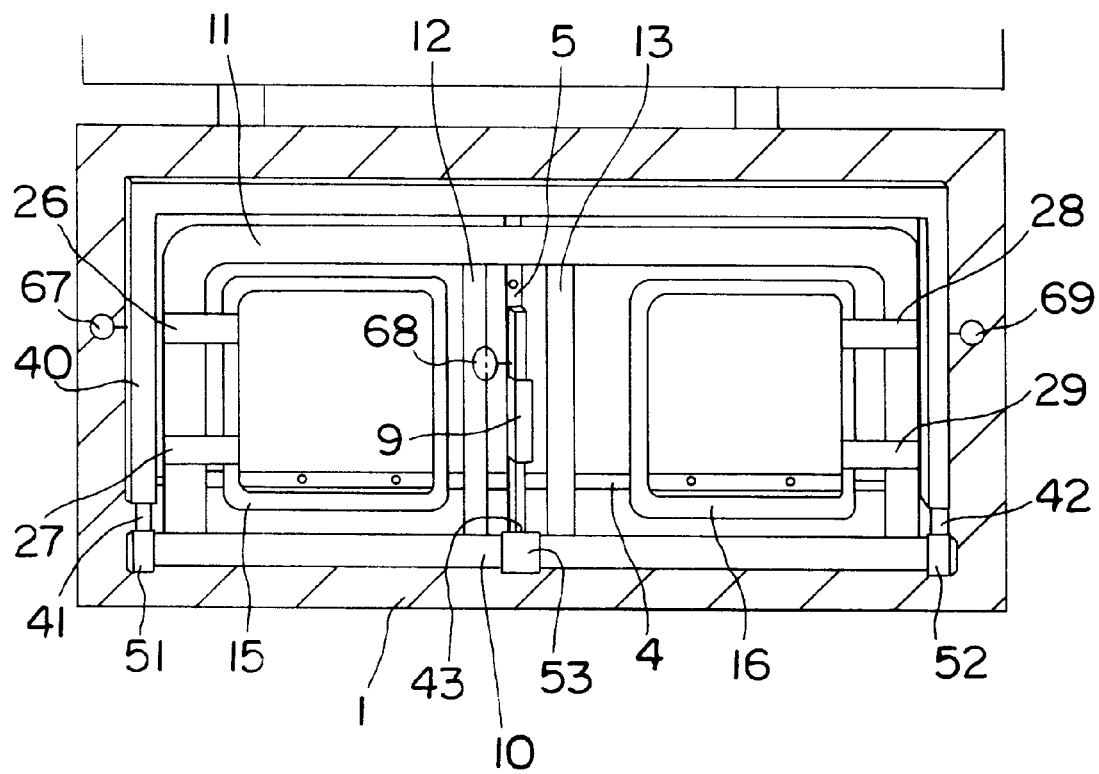
FIG. 5 shows another view of the embodiment of FIG. 1.

At FIG. 2 the embodiment of FIG. 1 is seen in detail. Side frames 15 and 16 are opened. Each of them is mounted on frame 11 and pivots along hinges attached to frame 11. For example, side frame 15 is carried on frame 11 by way of hinges 26 and 27. Referring briefly to FIG. 5, frames 15 and 16 are shown pivoted into frame 11 by way of hinges 26–27, and 28–29, respectively.

Turning back to FIG. 2, side frame 15 is shown pivoted outwardly, along hinges 26 and 27 and perpendicularly to the frame 11. The side frame 15 is, in this embodiment, constructed of 1-inch diameter steel tubing and the hinges 26 and 27 are metal strap hinges, wrapped around frame 11. Any materials known in the art may be used for the tubing and the hinges in other embodiments.

Plate 55 is affixed to side frame 15 and extends downwardly therefrom. Plate 55 will act as a stop to the pivoting of side frame 15 by contacting the side of bracket 40, in order to prevent the side frame 15 from moving further. A similar construction is seen with regard to side frame 16, however, the stop plate complement to stop plate 55 is not shown here. Pins not seen in this view are inserted through the bracket 40, into corresponding holes in the stop plates, and so prevent further movement of the frame. Hinges 28 and a second hinge 29 (not shown) carry the side plate 16 upon frame 11. The use of plates may be, as well, fixed or moveable in other embodiments, so that, for example, the side frames may be moved at various angles off the perpendicular. In other embodiments, other mechanisms known in the art may be used to prevent further movement of the frames.

Turning briefly to FIG. 5, a folded configuration of the side frames is seen. In this view, both side frames have been folded along their hinges, and nest within frame 11. Frame 11 is, in turn, folded along the hinges 51, 52 and 53 so that the entire assembly rests against the tailgate 1. (This folded configuration is also shown in profile in FIG. 1.) Frame 11 also has, in this embodiment, support tubes 12 and 13 welded to it along its upper tube as well as base member 10 of frame 11. Frame 11 as well as these support tubes 12 and 13 are formed of a length of 1-inch diameter steel tube. The hinges 51, 52 and 53 are metal strap hinges, wrapped around base member 10, and welded to the ends of extension members 41, 42 and 43, as is described in further detail below. Any materials known in the art may be used for the tubing and the hinges in other embodiments.

This embodiment has the ability to utilize plastic or other covers on the frames. These covers, also known as "skins" which may "dress up" the external appearance of the embodiment, as can be seen in FIG. 2. In this embodiment the skins 60, 70, 80 are shown with a slotted appearance and are molded ABS plastic. It is also possible to use PVC or other similar plastic. In some embodiments, in may be desired to provide the skins with raised or recessed ribs or other details. These could be molded into a plastic skin, or fastened thereto by methods known in the art, and would provide structural or ornamental enhancement.

The skins are fastened by screws, however, any method of fastening such as plastic fasteners, snap fit, or other means known in the art may be used. Additionally, in other embodiments, the appearance of these skins may be modified as desired. In other embodiments, other external devices may also be used, such as lights or the like, temporarily or permanently attached to the device.

In other embodiments, other external materials known in the art, or none, may be use. For example, aluminum, netting or other materials known in the art may be used. These may also be used to enclose or restrain the top of the embodiments. It may also be desirable, in certain embodiments to form a full enclosure about the frames, using materials known in the art. Other embodiments may also have the side panels extent while eliminating the back frame.

Figure 3:
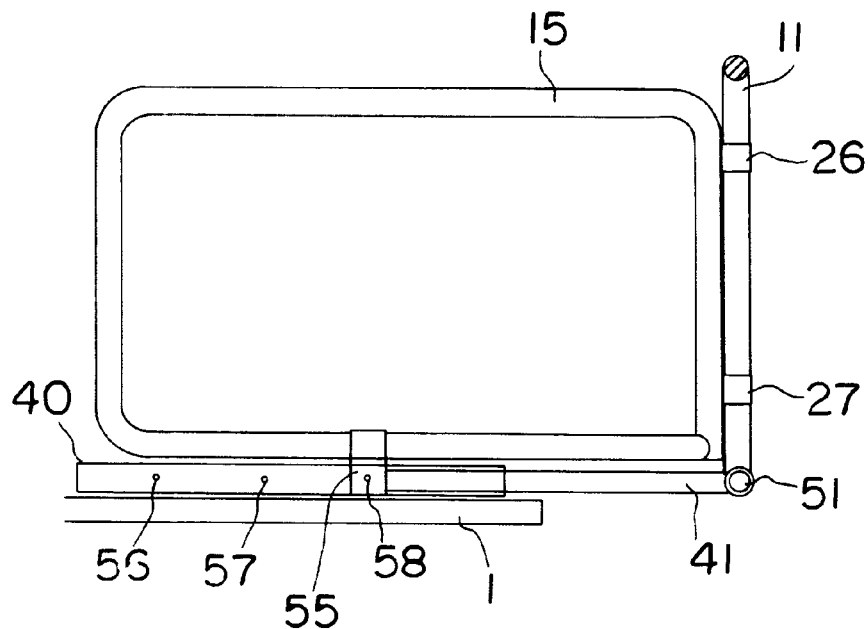
FIG. 3 shows a sectional view along line III—III in the embodiment of FIG. 2.

FIG. 3 is a view taken along lines III—III of FIG. 2 The extension member 41 is shown extended outwardly. Of course, the members 42 and 43 are also extended, but are not shown here. Holes 56, 57 and 58 are in bracket 40, and, in correspondence with the hole in stop plate 55, are used in conjunction with a pin arrangement, to allow for the extension of the embodiment at various predetermined intervals. A similar arrangement exists with regard to side frame 16.

The use of extension members permits even further extension of the present embodiment from the rear of the truck. In this embodiment, due to the structural constraints of the materials used, the furthermost extension is about eight inches. Of course, in other embodiments, different configurations or materials may permit lesser or greater outward extension. In another preferred embodiment, for example, the device extends enough, about 2", to permit the frame and nested panels to pivot downwardly over the lip of the tailgate upon which is mounted.

Additionally, in other embodiments, a floor may be utilized with the device and/or its extension, and thus provide further retention characteristics. For example, the embodiment seen in FIG. 2, which allows for an extension, and which uses the tailgate as essentially an extension of the floor, has no floor for the extended part. Yet, it is possible to use a collapsing or other type floor for the extension, so that the floor will be used at will.

Figure 4:
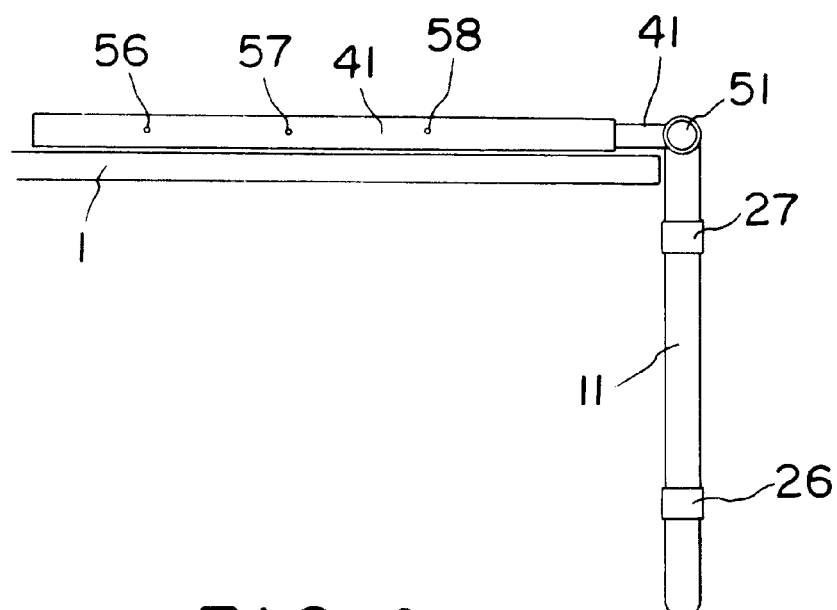
FIG. 4 shows another view of the embodiment of FIG. 1.

FIG. 4 is a view of the embodiment taken from outside the device. This figure shows the extension member 41 retracted. The other extension members are not shown here but they are retracted as well. Additionally the side frame 15 has been folded, that is pivoted, about its hinges 26 and 27 to nest within frame 11. Frame 11 has been pivoted downwardly, about the hinge 51, and the other hinges 52 and 53 (not shown here) past the horizontal plane of the tailgate 1.

At FIG. 5, the entire embodiment is shown folded against the tailgate 1. Here side frame 15 and side frame 16 can be seen. These frames are folded within frame 11, along hinges 26–29. Additionally, hinges 51, 52 and 53 operate to fold frame 11 flat against the tailgate, and extension members 41, 42 and 43 are retracted, so the entire embodiment fits within bracket 40. Pins 67 and 69 extend through the bracket 40 in a manner not shown here and retain frame 11 by entering into holes set therein.

Figure 6:
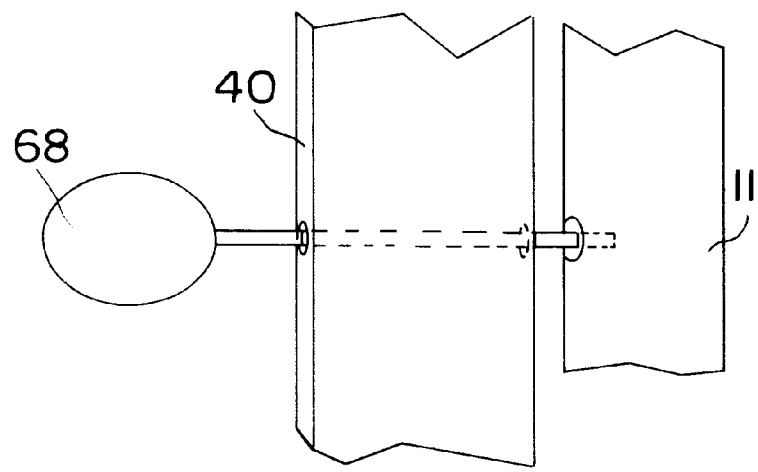
FIG. 6 shows another view of the embodiment of FIG. 1.

The use of pin 68 in this manner is shown in FIG. 6. Both side panels 15 and 16 are held in this closed position in this embodiment by the weight of their construction and the friction of hinges 26–29, as well as, if used, the plastic skin 70. In other embodiments, other means known in the art may be used to retain the side panels.

Also seen at FIG. 5 are the straps 4 and 5 which serve to retain the embodiment to the tailgate, through use of screws inserted through the straps into holes in the straps and the. tailgates. These straps also provide structural support to the embodiment as is described in further detail below. Bracket 9 and bracket 40 are both of box steel construction and serve to retain the steel tubes of extension members 41, 42 and 43.

Figure 7:
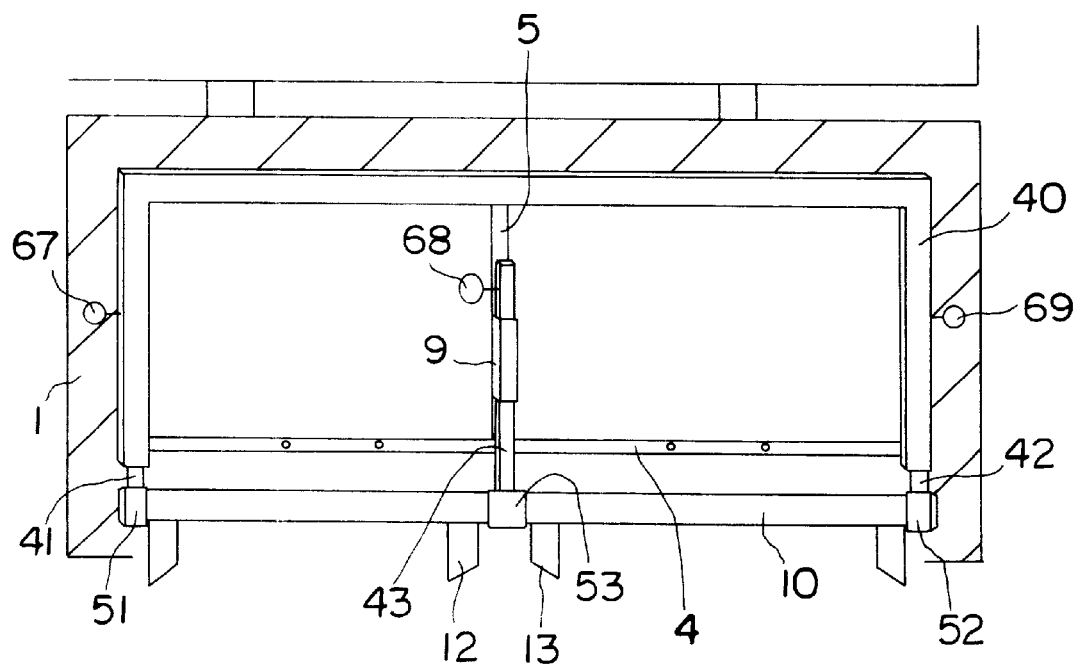
FIG. 7 shows another view of the embodiment of FIG. 1.

Turning to FIG. 7, the embodiment is shown unfolded along hinges 51, 52 and 53. Straps 4 and 5 are constructed of steel in this embodiment. They are welded to each other as well as to bracket 40. Bracket 9 is also welded to strap 5. Holes in the straps 4 and 5 are shown. These provide means for attaching bracket 40 to the tailgate by use of screws as is known in the art. In other embodiments, other means to attach the device to the tailgate may be used including straps and the like. For example, a clamp construction may be used instead of screws so that modification of the tailgate is not required as is the case with the screws above. Such a clamp or clamps may be mounted upon existing structures on the tailgate, or be screwed onto the tailgate, while retaining the bracket through a folded clamp or other configuration. Additionally, in yet other embodiments, attachment may be directly within the tailgate, whether by initial construction or post manufacture modification. For example, a slot may be cut within the tailgate so that an embodiment of the present invention may be inserted within the tailgate.

A pickup tailgate is not the only vehicle with which embodiments of the present vehicle may be utilized. Other vehicles with storage areas, including sport utility vehicles, vans, station wagons and the like may utilize embodiments of the present invention to extend storage areas, whether by incorporation in the original vehicle or after market additions.

Other embodiments of the invention also may have a mounting apparatus on the rear of the vehicle, rather than on the tailgate. For example, a bracket may be mounted between the rear side walls of the bed of a pickup truck, and so retain the device upon the vehicle. Of course, other embodiments may have other means of fastening the device to the vehicle bed. For example, use of one or more straps, extending from one or more side frames to anchor points on the truck side walls, may be possible.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

We claim:

1. An extension apparatus for the storage bed of a vehicle comprising:

a bracket;

first and second elongated extension members, each having a first and second end;

a first and second pivot means mounted to one end of said first and second extension members respectively;

a frame mounted to said first and second pivot means;

a first and second side frame, with cash of first and second side frames having a side frame pivot means mounted upon said frame;

whereby said side frames pivot outwardly along said side frame pivot means when the apparatus is mounted on the vehicle.

2. An apparatus as in claim 1, whereby said first and second extension members are mounted upon said bracket so as to permit at least some movement of said first and second extension members relative to said bracket.

3. An apparatus as in claim 1, whereby said bracket is mounted to a vehicle.

4. An apparatus as in claim 1, whereby said first and second extension members are slideably mounted within said bracket.

5. An apparatus as in claim 1, whereby said side frames are in nesting relationship with said frame, and said frame in turn is in nesting relationship to said bracket.

6. An apparatus as in claim 1, further comprising a first and second cover mounted upon each of said first and second side frame respectively, and a third cover mounted upon said frame.

7. An apparatus as in claim 6, whereby said first second and third covers are removeably mounted upon said first and second side frames and said frame.

* * * * *